US012511392B1

(12) United States Patent
Pryde et al.

(10) Patent No.: US 12,511,392 B1
(45) Date of Patent: Dec. 30, 2025

(54) RANSOMWARE DETECTION USING CRYPTOGRAPHIC API CALL GRAPH ANALYSIS

(71) Applicant: Halcyon Tech, Inc., Austin, TX (US)

(72) Inventors: Jayson Pryde, Bulacan (PH); Seagen Levites, Oregon City, OR (US); Ryan Smith, Austin, TX (US); Jonathan Miller, Poway, CA (US)

(73) Assignee: Halcyon Tech, Inc., Austin, TX (US)

( * ) Notice: Subject to any disclaimer, the term of this patent is extended or adjusted under 35 U.S.C. 154(b) by 0 days.

(21) Appl. No.: 19/315,097

(22) Filed: Aug. 29, 2025

(51) Int. Cl.
*G06F 21/56* (2013.01)
*G06F 21/54* (2013.01)
*G06F 21/55* (2013.01)

(52) U.S. Cl.
CPC ............ *G06F 21/566* (2013.01); *G06F 21/54* (2013.01); *G06F 21/554* (2013.01)

(58) Field of Classification Search
CPC ....... G06F 21/566; G06F 21/54; G06F 21/554
See application file for complete search history.

(56) References Cited

U.S. PATENT DOCUMENTS

| | | | |
|---|---|---|---|
| 10,621,613 B2 * | 4/2020 | Shiravi Khozani | G06Q 30/0248 |
| 11,270,016 B2 * | 3/2022 | Kallos | H04L 63/1408 |
| 11,277,390 B2 * | 3/2022 | Verzun | G06F 21/64 |
| 2015/0341167 A1 * | 11/2015 | Gregory | G06F 13/36 380/281 |
| 2017/0068816 A1 | 3/2017 | Cavazos | |
| 2018/0205552 A1 * | 7/2018 | Struttmann | G06F 21/602 |
| 2019/0012459 A1 * | 1/2019 | Choi | G06F 21/568 |
| 2019/0108340 A1 | 4/2019 | Bedhapudi et al. | |
| 2020/0082084 A1 * | 3/2020 | Kallos | G06F 21/568 |
| 2020/0082109 A1 * | 3/2020 | Kallos | G06N 3/045 |
| 2020/0084236 A1 * | 3/2020 | Kallos | H04L 63/1466 |
| 2025/0045381 A1 * | 2/2025 | Ramalingam | G06F 40/295 |

OTHER PUBLICATIONS

Gulmez et al., 2024, "XRan: Explainable deep learning-based ransomware detection using dynamic analysis," Computers & Security 139(1):1-18.
Guo et al., 2025, "MalHAPGNN: An Enhanced Call Graph-Based Malware Detection Framework Using Hierarchical Attention Pooling Graph Neural Network," Sensors 25(2):1-23.

(Continued)

*Primary Examiner* — Chau Le
(74) *Attorney, Agent, or Firm* — Jones Day

(57) ABSTRACT

An agent executing on a monitored computing device intercepts runtime execution data associated with a process by utilizing hooks into cryptographic application programming interfaces (APIs). The agent constructs a dynamic execution graph, where each node represents an intercepted cryptographic API call and each edge reflects an inferred relationship between nodes derived from the runtime execution data. Cryptographic entanglement metrics are computed based on the dynamic execution graph, characterizing structural properties of cryptographic behavior within the process. When these computed metrics indicate that the process is part of a ransomware attack, one or more remediation actions are initiated to thwart the advancement of the attack.

28 Claims, 3 Drawing Sheets

(56) References Cited

OTHER PUBLICATIONS

Any Run, "Any Run Interactive Malware Analysis Homepage," As accessed on Aug. 28, 2025, Available onlune at: https://any.run/ (13 pages).
Linkurious, "Graph analytics: Getting deeper insights from your data," Accessed on Aug. 28, 2025, Available online at: https://linkurious.com/graph-analytics/ (17 pages).

* cited by examiner

RANSOMWARE DETECTION USING CRYPTOGRAPHIC API CALL GRAPH ANALYSIS

TECHNICAL FIELD

The subject matter described herein relates to techniques for thwarting ransomware attacks through monitoring and characterizing application programming interface (API) calls by processes which are related to cryptography operations.

BACKGROUND

Ransomware attacks have evolved into highly sophisticated threats that exploit vulnerabilities within targeted applications to infiltrate systems, exfiltrate sensitive information, and encrypt critical files. These attacks often leverage advanced encryption algorithms and automated tools to maximize operational disruption and exert significant pressure on victims to pay a ransom. Modern ransomware is capable of targeted exploitation, moving laterally within an application's environment, and intelligently identifying and prioritizing high-value data for encryption. Rapid detection and response to these malicious activities are essential for effectively countering ransomware threats, making the ability to make timely, localized security decisions within the environment increasingly important.

SUMMARY

An agent executing on a monitored computing device intercepts runtime execution data associated with a process by utilizing hooks into cryptographic application programming interfaces (APIs). The agent constructs a dynamic execution graph, where each node represents an intercepted cryptographic API call and each edge reflects an inferred relationship between nodes derived from the runtime execution data. Cryptographic entanglement metrics are computed based on the dynamic execution graph, characterizing structural properties of cryptographic behavior within the process. When these computed metrics indicate that the process is part of a ransomware attack, one or more remediation actions are initiated to thwart the advancement of the attack.

Cryptographic entanglement metrics comprise quantitative measures of structural complexity and interconnectedness within cryptographic API call patterns The hooks employed by the agent capture various types of information, including the identity of the process and its corresponding calling thread, memory addresses of input and output buffers, cryptographic key material references, cryptographic algorithm parameters, and the timing and frequency of each API invocation. The agent may generate the cryptographic entanglement metrics locally or transmit the runtime execution data to a remote monitoring platform, which then generates the metrics.

The dynamic execution graph is generated by analyzing the runtime execution data to identify control-flow and data-flow dependencies. The cryptographic entanglement metrics may include entropy metrics and graph complexity metrics, such as graph density (indicating the interconnectedness of cryptographic operations), betweenness and centrality measures (reflecting the extent to which a node lies on paths between other nodes), cycle count or recursion depth (identifying feedback loops and recursive structures), and clustering coefficient (characterizing the degree to which nodes cluster together).

The dynamic execution graph and the computed metrics are input into an engine or at least one machine learning model to determine whether the process is part of a ransomware attack. The engine or model evaluates the graph and metrics relative to a corpus of known benign and malicious patterns. The dynamic execution graph may take the form of a directed acyclic graph (DAG), with each node corresponding to an intercepted cryptographic function and each edge encoding a control-flow or data-flow relationship.

The machine learning model may include at least one graph neural network, such as a graph convolutional network, graph attention network, or graph isomorphism network. Training of the graph neural network involves executing known benign and malicious software samples in a controlled sandbox environment, monitoring their cryptographic behavior, constructing dynamic execution graphs for each sample, and using the resulting corpus of labeled graphs for training. The model may minimize cross-entropy loss over its classification output and may comprise an ensemble of independently trained graph neural networks with combined or weighted outputs. An unsupervised autoencoder may also be used to detect previously unseen or obfuscated ransomware variants by identifying structural or statistical deviations from known-good entropy and complexity profiles. Features input into the machine learning model may include node and edge count, graph density, betweenness and centrality, cycle count or recursion depth, and clustering coefficient.

Remediation actions initiated in response to detection of ransomware activity may include flagging the process for further inspection or administrative review, suspending or terminating the process, isolating or revoking access to associated files, blocking outbound network communication, and capturing snapshots of memory used by the process for forensic analysis.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to techniques for thwarting or otherwise remediating a malicious attack on a monitored computing device and/or computing environment. With the current subject matter, a control-flow or call-flow graph of cryptographic API calls (e.g., Windows CryptoAPI, OpenSSL) within a process can be calculated and such information can be used by one or more engines (e.g., executing rules or heuristics) and/or machine learning models to determine whether the process is exhibiting behavior indicative of or otherwise associated with a malicious attack including a ransomware attack (in which files are being encrypted).

Ransomware is frequently characterized by the execution of tightly coupled sequences comprising cryptographic key generation, data encryption, and input/output (I/O) operations. These operations are typically invoked in close temporal proximity and exhibit strong interdependencies, thereby producing complex and highly entangled control-flow and data-flow graphs. The resulting graph structures are marked by high connectivity, repeated utilization of cryptographic primitives, and recurrent memory access patterns.

Such entanglement often arises from iterative processing over file system data, reuse of memory buffers, and sequential chaining of encryption-related function calls. These characteristics persist regardless of whether the underlying cryptographic functionality is implemented through standardized libraries or custom-developed code. Consequently, traditional detection mechanisms—especially those reliant on static signatures or known API usage—may fail when faced with obfuscation, dynamic loading, or cryptographic code substitution.

The current subject matter addresses this deficiency by identifying and leveraging the inherent structural complexity present in cryptographic execution graphs. Rather than relying on specific function identifiers, the current techniques evaluate topological and statistical properties of the cryptographic behavior itself. This approach can facilitate the detection of ransomware based on behavioral graph entanglement, providing resilience against code-level evasion techniques and enabling robust identification of malicious encryption workflows.

Figure 1:
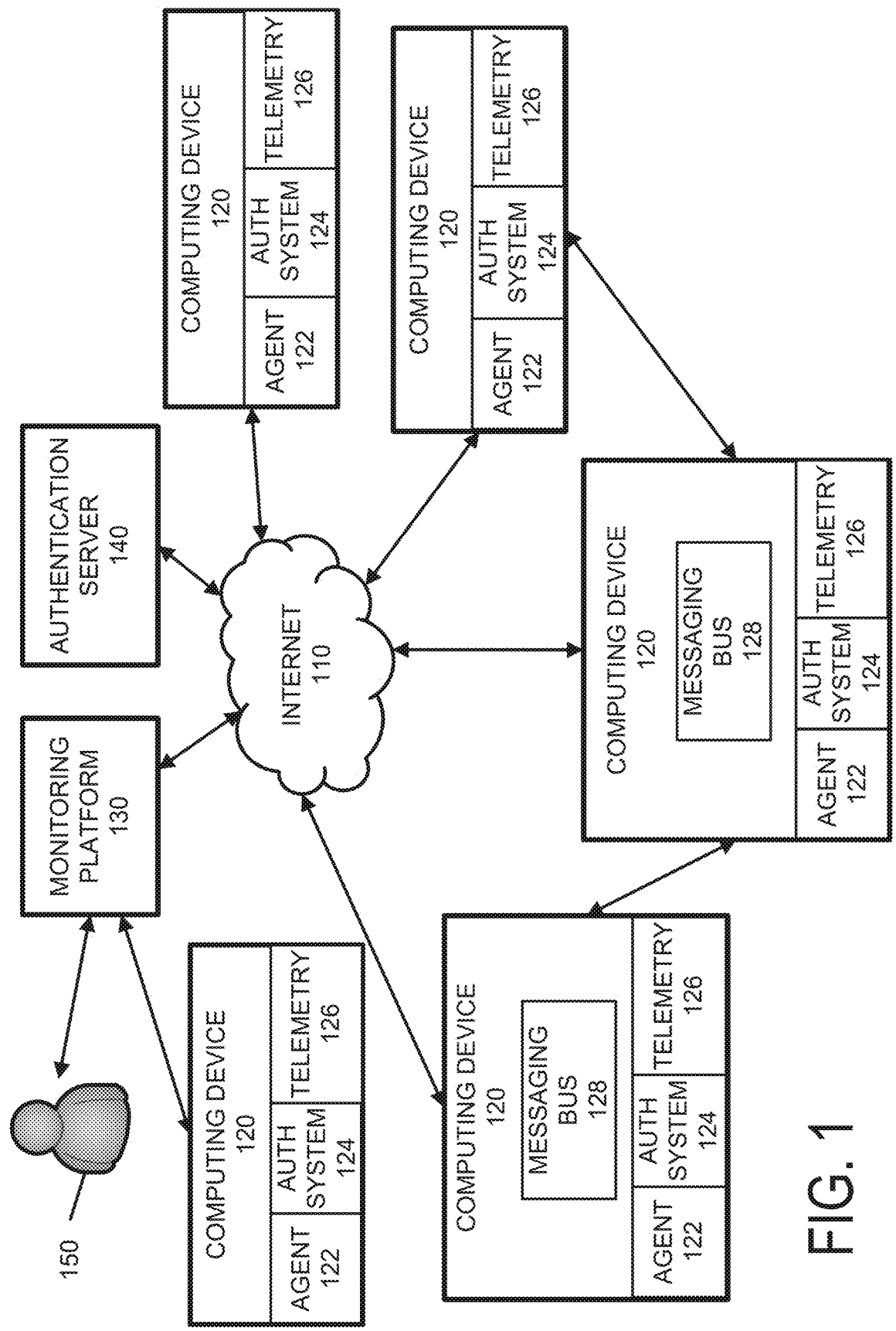
FIG. 1 is an architecture diagram illustrating aspects of a security monitoring platform in which agents are installed on computing devices.

FIG. 1 is an architecture diagram in which a monitoring platform 130 can monitor and protect a plurality of computing devices 120 (e.g., endpoints, etc.) by way of the Internet 110 or by way of direct connections (e.g., on-premise protection, etc.). Each of the monitored computing device 120 can include or otherwise execute at least one agent 122 which can execute or interface with an authentication system 124 and one or more telemetry components 126. The monitoring platform 130 can communicate with one or more users forming part of a Security Operations Center (SOC) 150 such as ransomware detection and response teams which can initiate one or more authentication processes in order to thwart a ransomware attack.

The authentication system 124 is a local application and/or process to selectively provide access to resources when a user is authenticated. The authentication system 124 can execute local authentication measures and/or it can interface with a remote authentication server 140.

The telemetry components 126 can be executed on the computing device and can individually or in combination be used to locally analyze security events and/or to transmit data to the monitoring platform 130 (i.e., cloud-based platform, etc.) which characterize security events. In some cases, the telemetry component 126 solely works locally while, in other variations, the telemetry component 126 works in coordination with the monitoring platform 130. The computing environment can also include an authentication platform 140 which can be accessed via an API to provide authentication services to applications and processes on the various computing devices 120. The authentication platform 140 can also interface or otherwise consume information generated by the telemetry component 126. In some cases, some or all of the functionality of the monitoring platform 130 can be performed, for example, locally on the computing device 120 (e.g., by the agent 122 and/or the telemetry component 126). Similarly, in some cases, some or all of the functionality of the authentication platform 140 can be performed, for example, locally on the computing device 120 (e.g., by the agent 122 and/or the telemetry component 126). In some cases, the authentication platform 140 can implement more secure authentication techniques when a ransomware attack is suspected or had otherwise commenced. When the authentication platform 140 acts as a service, the authentication techniques for particular applications, processes, and/or computing devices 120 can be dynamically adjusted on such authentication platform 140. In addition or in the alternative, the authentication platform 140 can send commands/signals to the various computing devices 120 which result in the particular authentication scheme used at the computing device 120 to be accordingly modified.

In some cases, the computing device 120 can execute a messaging bus 128 which selectively processes and transmits messages characterizing security events. The messaging bus 128 can generate, process, and transmit messages that are derived from security events generated or identified by the agent 122 or the telemetry component 126 and/or from other sources executing on the corresponding computing device 120 or a peer computing device 120. Further details regarding the messaging bus 128 can be found in U.S. Pat. No. 12,130,914, the contents of which are hereby fully incorporated by reference. In some cases, the computing device 120 can also execute a kernel model such as described in U.S. patent application Ser. No. 19/084,548 filed on Mar. 19, 2025, the contents of which are hereby fully incorporated by reference.

In some cases, the agent 122 can be installed after a security event such as a ransomware attack. With this example, ransomware has already infiltrated at least one of the computing devices 120 and encrypted certain files for which a decryption key will be provided in exchange for a ransomware payment. In such cases, the agent 122 can be installed on the computing device(s) 120 to facilitate remediation of the security event. In the case of ransomware, the remediation can include decrypting the encrypted files and/or transporting the encrypted files to the monitoring platform 130 (or to a different cloud-based service). In order to facilitate local decryption, the agent 122 can collect information characterizing the encrypted files. For example, the agent 122 can identify or generate a list of files that were encrypted as well as the key material used in the encryption of each particular file. In order to identify the encrypted files, an algorithm can analyze the file name, extension and contents of a particular file to see if it is encrypted. Key material, in this context, refers to variables needed to create a key which can be dependent on the utilized encryption algorithm. The encryption information can be used to generate and deliver decryptor logic (i.e., logic/code to decrypt encrypted files) in the form of a surveyor transported in the form of a surveyor package. A surveyor can be a standalone component that can be run by the agent 122 in order to extend the functionality of the agent 122. The surveyor, when executed by the agent 122, can cause the encrypted files to be decrypted. In some cases, even if the decryptor logic is the same (i.e., a same encryption technique is used for all files), the key materials for each file might be different. Further details regarding surveyors and the updating of agents can be found in U.S. patent application Ser. No. 18/948,343 filed on Nov. 14, 2024, the contents of which are hereby fully incorporated by reference.

The monitoring platform 130 can take telemetry data from the telemetry components 126 on the computing devices 120 (i.e., endpoints, etc.) and use individual endpoint telemetry data and telemetry from a plurality of endpoints, determines the current likelihood that a ransomware or other malicious attack is underway by deriving a risk level. The telemetry components 126 can, by way of the respective messaging buses 128, individually transmit data characterizing information such as intra-process and inter-process behavior, static analysis of machine instructions, and authentication anomalies. The telemetry components 126 can, for example, capture information such as login timestamps, login failure counts, login locations, network folder access requests, network file enumeration requests, privileged processes access requests, process security context, modifications to system settings, and the like. This information can be aggregated by the monitoring platform 130 across multiple computing devices 120 to provide higher level computing environment telemetry such as patterns among computing device 120, and telemetry from network devices in order to determine the likelihood that an attack is taking place.

Figure 2:
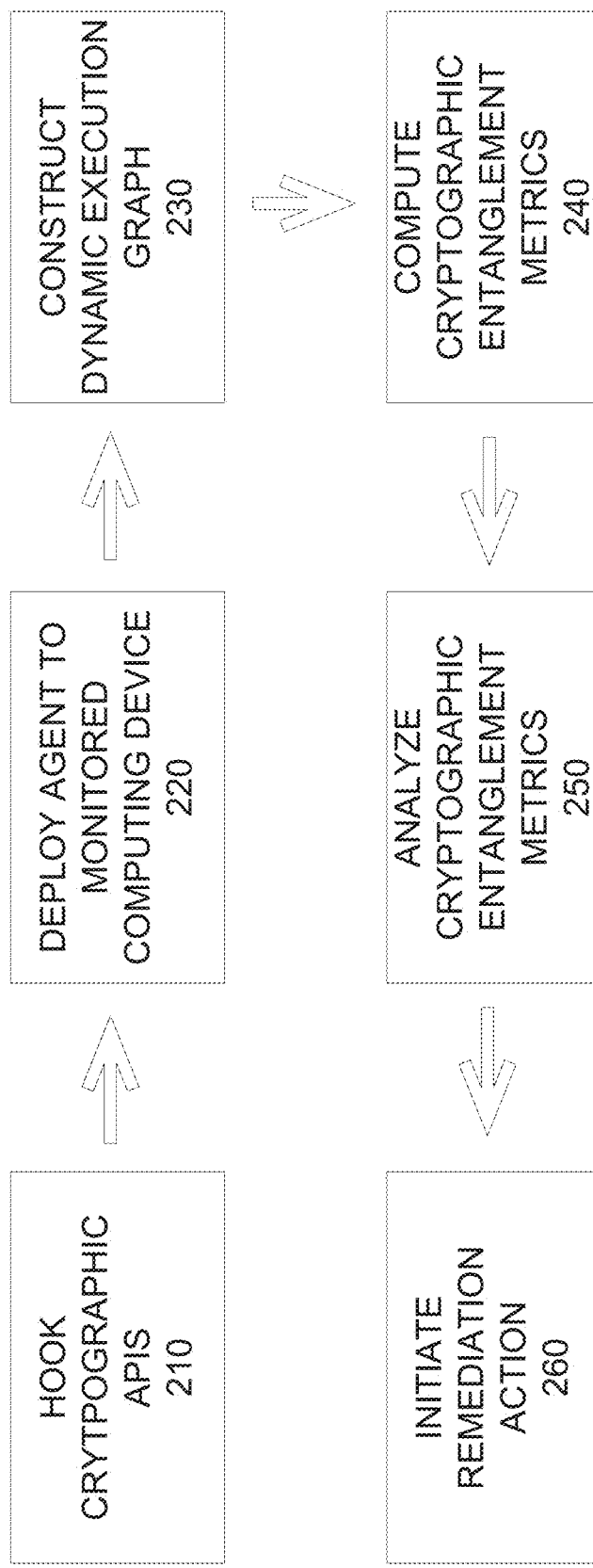
FIG. 2 is a diagram illustrating a first workflow for cryptographic API graph entanglement detection.

FIG. 2 is a diagram illustrating a workflow for implementing aspects of the current subject matter. At 210, cryptographic application programming interfaces (APIs) (e.g., CryptEncrypt, EVP_EncryptInit, and similar functions) can be hooked thereby enabling the interception and logging of runtime execution data. Such hooks can be configured to capture information including, but not limited to: the identity of the calling process and thread, memory addresses of input and output buffers, cryptographic key material references (when accessible), algorithm parameters (e.g., cipher mode, key length, initialization vector), the timing and frequency of each API invocation, and the like. This instrumentation can provide foundational telemetry required to construct dynamic execution graphs that reflect both control flow and data dependency patterns among cryptographic operations.

Thereafter, at 220, the agent can be deployed to the monitored computing device. As noted above, the agent 122 can be configured to operate either locally or in coordination with the monitoring platform 130. The agent 122 can be responsible for interfacing with the target operating system (i.e., the operating system of the monitored computing device 120) to gain visibility into the runtime behavior of active processes. In one variation, the agent 122 can attach to a selected process or set of processes and initiates artificial execution of such process(es) within a controlled sandbox environment. The sandbox environment can be configured to replicate typical runtime conditions while enabling comprehensive instrumentation of cryptographic API usage, memory interactions, and control flow paths. Data collected by the agent 122 can be transmitted to the monitoring platform 130 for further analysis or may be processed locally depending on deployment constraints.

Based on the hooked runtime execution data and/or other telemetry data, a dynamic execution graph can be generated, at 230, in which each node corresponds to an intercepted cryptographic API call, and each edge represents an inferred relationship derived from runtime telemetry. The hooked data which can, for example, include memory buffer addresses, parameter values, temporal ordering of calls, and thread or process identifiers, can be analyzed to identify control-flow and data-flow dependencies. For example, if the output buffer of one API call is subsequently used as the input to another, a directed edge can be established to denote a data dependency. Similarly, sequential API invocations occurring within a defined temporal window may be linked to reflect execution order. The resulting dynamic execution graph captures the structural and behavioral topology of cryptographic activity, serving as the basis for subsequent analysis.

Thereafter, at 240, cryptographic entanglement metrics can be calculated based on the dynamic execution graph. These cryptographic entanglement metric can include, for example, graph and complexity characteristics which characterize the structural properties of cryptographic behavior within a process. The following are example metrics that can form part of the cryptographic entanglement metrics.

Node/edge count can characterize the total number of cryptographic API invocations (nodes) and the inferred data/control-flow relationships among them (edges).

Graph density can be calculated as the ratio of the actual number of edges to the maximum possible number of edges in a directed graph. This metric provides an indication of how interconnected the cryptographic operations are, with higher density suggestive of complex or highly entangled behavior.

Betweenness/centrality can characterize the extent to which a node lies on paths between other nodes, highlighting API calls that act as key intermediaries in a cryptographic data flow. Centrality, more generally, identifies nodes that are critical to the graph's connectivity.

Cycle count or recursion depth can be computed by identifying feedback loops and recursive structures within the dynamic execution graph. These values can correspond to repeated encryption passes or nested processing logic, which are characteristic of ransomware.

Clustering coefficient can characterize the degree to which nodes in the dynamic execution graph tend to cluster together. A high coefficient can indicate repeated co-use of specific APIs or buffers, which can signal orchestrated encryption logic.

The graph density metric can be computed mathematically as $D=E/(N \times (N-1))$, where E represents the number of edges in the dynamic execution graph and N represents the number of nodes (cryptographic API calls). For a fully connected graph, the density approaches 1.0, while sparse graphs exhibit densities closer to 0. In experimental validation, ransomware samples typically exhibit graph densities between 0.3 and 0.8, while benign cryptographic applications show densities below 0.2

Betweenness centrality for a node v can be calculated as $BC(v)=\Sigma(\sigma\_st(v)/\sigma\_st)$, where the summation is over all pairs of distinct nodes s and t, $\sigma\_st$ represents the total number of shortest paths between nodes s and t, and $\sigma\_st(v)$ represents the number of shortest paths that pass through node v. Nodes with high betweenness centrality (BC>0.5) often correspond to critical cryptographic operations such as key generation or initialization vector creation that are frequently reused across multiple encryption operations.

The clustering coefficient for a node v with degree $k\_v$ can be computed as $CC(v)=2e\_v/(k\_v \times (k\_v-1))$, where $e\_v$ represents the number of edges between the $k\_v$ neighbors of node v. The overall clustering coefficient for the graph is the average of individual node clustering coefficients. Ransomware samples frequently exhibit clustering coefficients above 0.6, indicating tight coupling between related cryptographic operations, while benign applications typically show coefficients below 0.3.

Cycle detection can be implemented using depth-first search (DFS) with a recursive stack to identify back edges that create cycles. The cycle count metric C represents the total number of simple cycles detected in the graph. Recursive encryption operations, common in ransomware that processes directory trees, typically produce cycle counts between 5 and 50, depending on the depth of directory traversal and the complexity of the encryption workflow.

These metrics can be integrated into or otherwise instantiated by a rule-based detection engine which applies predefined thresholds or heuristic conditions are applied. For instance, rules can flag processes exhibiting graph density above a certain threshold combined with elevated cycle counts and centrality values in encryption-related nodes. The rule engine can function as an intermediary stage in the workflow; after graph construction and metric computation, the rules engine can evaluate the graph against a corpus of known benign and malicious patterns to classify the observed behavior. The outcome, whether a process is flagged as suspicious or normal, can then be used to trigger additional analysis, alerts, or response actions. The rules engine can be executed at the computing device 120 (e.g., by the agent 124) and/or by the monitoring platform 130 (which received the relevant information from the agent 124).

Thereafter, at 250, the entanglement metrics and/or the dynamic execution graph are analyzed. In some variations, this analysis can include one or more of the dynamic execution graphs or the entanglement metrics being ingested (i.e., input) into one or more machine learning models to determine whether the process is indicative of a ransomware attack.

As an example, a graph neural network (GNN) can be used to provide dynamic graph analysis. Cryptographic API calls and their associated temporal and data dependencies may be modeled as directed acyclic graphs (DAGs), wherein each node corresponds to an intercepted cryptographic function, and each edge encodes a control-flow or data-flow relationship. However, some ransomware operations may also involve recursive or iterative processing that creates cyclic structures in the execution graph. To accommodate both scenarios, the graph representation supports both acyclic and cyclic structures, with cycle detection algorithms used to identify recursive patterns that may be indicative of iterative file encryption processes. These graphs can be subsequently transformed into numerical representations through embedding techniques in which both nodes and edges are encoded as feature vectors reflecting properties such as API type, parameter structure, buffer access characteristics, and invocation timing.

The resulting graphical datasets can be utilized to train various classes of graph neural networks (GNNs), including but not limited to: Graph Convolutional Networks (GCNs), Graph Attention Networks (GATs), and Graph Isomorphism Networks (GINs).

In an example training procedure, a labeled corpus of execution graphs is first constructed by executing known-benign and known-malicious software samples in a controlled sandbox environment. During this process, cryptographic behavior is captured, graphs are constructed, and corresponding labels (e.g., benign or ransomware) are applied.

Training can proceed using supervised learning paradigms in which cross-entropy loss is minimized over the classification output of the GNN. In other variations, semi-supervised or contrastive learning techniques can be employed, especially when labels are partially available. Data augmentation methods such as subgraph sampling or node masking can be used to improve generalization.

In certain variations, multiple GNN architectures can be trained independently and their outputs aggregated via an ensemble method. For example, the softmax probabilities or graph embeddings generated by each model can be combined through voting, averaging, or stacking to produce a more robust classification. Furthermore, the GNN-derived anomaly scores can be fused with the rule-based system described earlier in which statistical graph metrics (e.g., density, centrality) serve as supplementary features or gating criteria in the ensemble decision process. This hybrid framework enhances detection accuracy by capturing both structural anomalies and learned behavioral signatures across multiple levels of abstraction.

In some variations, entropy and statistical behavior modeling can be performed using autoencoders.

Unsupervised autoencoders can be employed to model the statistical properties of cryptographic behavior as observed through entropy metrics and graph-based features. In one variation, a dataset can be generated by executing a diverse set of known-legitimate applications under controlled conditions, during which entropy values (e.g., Shannon entropy of memory buffers, files, or I/O streams) and graph complexity metrics (such as those described above) are recorded for each process instance.

The input feature vector for each instance can include scalar values such as graph density, node/edge count, average entropy, and clustering coefficient, optionally augmented with time-series windows of these metrics. These vectors can be used to train an autoencoder, typically comprising a symmetric neural network with an encoder that compresses the input into a latent representation and a decoder that attempts to reconstruct the original input from this latent space.

In one variation, a variational autoencoder (VAE) or a denoising autoencoder can be used to enhance robustness and generalization. The model can be trained to minimize a reconstruction loss function, commonly the mean squared error (MSE) or mean absolute error (MAE), between the original input vector and its reconstructed output.

At inference time, when a new process is observed, its corresponding feature vector can be passed through the trained autoencoder. The reconstruction error can be computed and compared against a threshold value determined during the training phase using statistical analysis of the training error distribution. Specifically, the threshold may be established using percentile-based methods, such as setting the threshold at the 95th or 99th percentile of reconstruction errors observed on the training dataset of known-good samples. Alternatively, receiver operating characteristic (ROC) analysis can be performed using a validation set containing both benign and malicious samples to optimize the threshold for a desired false positive rate. In one variation, the threshold T can be computed as $T=\mu+k \times \sigma$, where $\mu$ is the mean reconstruction error on benign training samples, $\sigma$ is the standard deviation, and k is a configurable multiplier (typically between 2 and 4) selected based on desired sensitivity. If the reconstruction error exceeds this threshold, the process can be flagged as exhibiting anomalous cryptographic behavior.

This technique enables the detection of previously unseen or obfuscated ransomware variants that exhibit structural or statistical deviations from known-good entropy and complexity profiles, even in the absence of explicit malware labels.

In some variations, one or more machine learning models can be used to characterize graph complexity. As an alternative or complement to the use of GNNs, the current subject matter can employ a feature-based classification approach using statistical graph complexity metrics extracted from each process's dynamic execution graph (e.g., node and edge count, graph density, betweenness and centrality, cycle count or recursion depth, clustering coefficient, etc.) which, in turn, can be used to construct fixed-length feature vectors. These vectors can serve as inputs to machine learning classifiers such as decision trees, support vector machines (SVMs), random forests, or gradient boosting algorithms. In another variation, unsupervised learning techniques such as k-means clustering or Gaussian mixture modeling can be applied to partition the metric space into clusters representing known-benign and anomalous behavior profiles.

During training, clusters can be formed using a corpus of feature vectors derived from known-good software samples. For classification at inference time, the feature vector associated with a new process can be evaluated based on its proximity to established clusters using a distance metric such as Euclidean or Mahalanobis distance. If the vector falls outside the acceptable radius or density bounds of known-good clusters, one or more remediation actions can be initiated (e.g., the process can be flagged as potentially malicious, etc.).

This approach enables rapid detection based on interpretable features and can operate independently of graph structure learning. It is particularly well-suited for environments in which explainability or low computational overhead is prioritized. Moreover, it can be integrated into an ensemble architecture alongside GNN-based models, allowing for cross-validation of anomalies detected through topological learning with those flagged through statistical deviation from normative graph profiles.

Referring again to FIG. 2, at 260, various remediation actions can be initiated in response a determination that the process is exhibiting behavior indicative of ransomware (e.g., high cryptographic call entanglement, etc.). Identify and respond to processes exhibiting unusually high levels of cryptographic call entanglement, as determined by the computed graph metrics and/or outputs generated by machine learning models. Upon classification of a process as anomalous or potentially malicious, a range of remediation actions may be initiated. In one embodiment, the process can be flagged for further inspection or administrative review. In addition or the alternative, automated containment procedures can be triggered, including but not limited to: suspending or terminating the offending process, isolating or revoking access to affected files (i.e., files associated with the files), blocking outbound network communication, capturing memory snapshots for forensic analysis, and the like.

These remediation actions can be governed by configurable policy rules and thresholds, allowing for graded response strategies based on the severity of the detected anomaly.

Figure 3:
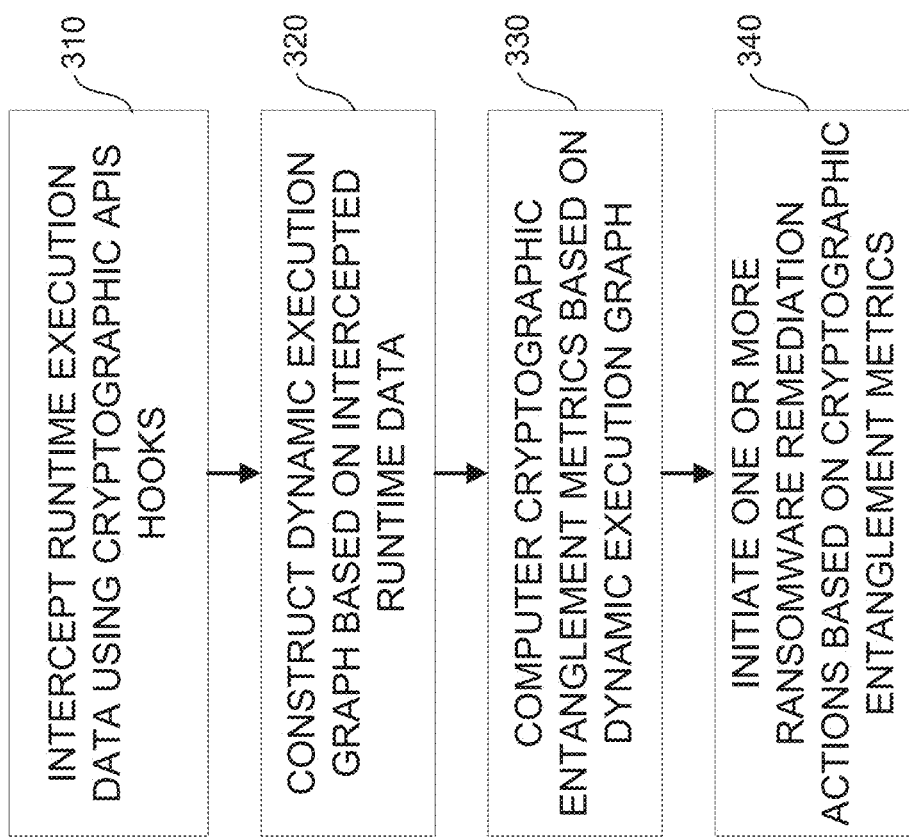
FIG. 3 is a diagram illustrating a second workflow for cryptographic API graph entanglement detection.

FIG. 3 illustrates a process in which, at 310, an agent executing on a monitored computing device, intercepts, using one or more hooks into cryptographic application programming interfaces (APIs), runtime execution data associated with a process executing on the monitored computing device. Thereafter, at 320, a dynamic execution graph is generated in which each node corresponds to an intercepted cryptographic API call and each edge represents an inferred relationship between nodes derived from the runtime execution data. Cryptographic entanglement metrics are computed, at 330, based on the dynamic execution graph which characterize structural properties of cryptographic behavior within the process. One or more remediation actions are initiated, at 340, when the computed cryptographic entanglement metrics indicate that the process is part of ransomware attack. These one or more remediation actions can act to thwart advancement of the ransomware attack.

The current subject matter provides various technology advantages. For example, the current subject matter goes beyond signature-based ransomware detection by analyzing cryptographic behavior structure, even if obfuscated or custom-coded, as it detects the behavioral structure of the cryptographic logic.

With the current subject matter, the focus is on behavioral Topology, not code identifiers As the current techniques detect how the code behaves structurally, even if the ransomware uses custom crypto libraries, obfuscated control flow, or dynamic code loading (as examples), it still need to generate keys, encrypt data, and traverse files, which leaves structural fingerprints in the cryptographic call graph.

The current subject matter is also advantageous in that it can capture control/data dependency patterns. Even custom-rolled cryptography has to allocate memory buffers, load or generate keys, loop over file data in blocks, and then do the encrypt→write→loop flow. These patterns are detectable via:

API sequences (e.g. memory→crypto→I/O)
    Clustering the timing of the calls
    Graph topology (dense directed acyclic graphs (DAGs), high reuse of buffers, etc.)

Still further, the current subject matter is advantageous in that it detects functional equivalents of API calls. Ransomware authors may write custom EncryptFile( ) function(s), which will cause CryptEncrypt not to be called. Though this is the case, the malware will still perform operations such as substitution and permutation, key scheduling, nonce generation, blockwise operations and the like. The current techniques can capture or otherwise characterizes these operations through instruction-level profiling, indirect memory access chains, and/or custom graph feature embeddings.

The current techniques are also advantageous in that the are resistant to dead code and junk injection. Junk instructions or dummy calls may increase the graph size, but not its entanglement. The current techniques can take this into account and weigh factors such as semantic edges (data shared), call timing, reused keys or buffers to deprioritize noise and focus on the meaningful cryptographic analysis.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED, OLED, or LCD screen/monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computing devices comprising:
   intercepting, by an agent executing on a monitored computing device and by using one or more hooks into cryptographic application programming interfaces (APIs), runtime execution data associated with a process executing on the monitored computing device;
   constructing a dynamic execution graph in which each node corresponds to an intercepted cryptographic API call and each edge represents an inferred relationship between nodes derived from the runtime execution data;
   computing cryptographic entanglement metrics based on the dynamic execution graph which characterize structural properties of cryptographic behavior within the process; and
   initiating one or more remediation actions when the computed cryptographic entanglement metrics indicate that the process is part of ransomware attack, the one or more remediation actions acting to thwart advancement of the ransomware attack.

2. The method of claim 1, wherein the one or more hooks capture process execution context data comprising one or more of: an identity of the process and corresponding calling thread, memory addresses of input and output buffers used by the process, and timing and frequency of each API invocation by the process.

3. The method of claim 1, wherein the one or more hooks capture cryptographic operation data comprising one or more of: cryptographic key material references used by or generated by the process, and cryptographic algorithm parameters used by the process.

4. The method of claim 1, wherein the cryptographic entanglement metrics are generated by the agent.

5. The method of claim 1 further comprising:
   transmitting, by the agent to a remote monitoring platform, the runtime execution data;
   wherein the cryptographic entanglement metrics are generated by the remote monitoring platform.

6. The method of claim 1, wherein the dynamic execution graph is generated by analyzing the runtime execution data to identify control-flow and data-flow dependencies.

7. The method of claim 1, wherein the cryptographic entanglement metrics comprise entropy metrics and graph complex metrics.

8. The method of claim 1, wherein the cryptographic entanglement metrics comprise:
graph density which characterizes how interconnected are cryptographic operations associated with the process with higher density indicative of complex highly entangled behavior.

9. The method of claim 1, wherein the cryptographic entanglement metrics comprise:
betweenness/centrality measures which characterize an extent to which a node lies on paths between other nodes.

10. The method of claim 1, wherein the cryptographic entanglement metrics comprise:
cycle count or recursion depth computed by identifying feedback loops and recursive structures within the dynamic execution graph.

11. The method of claim 1, wherein the cryptographic entanglement metrics comprise:
clustering coefficient which characterizes a degree to which nodes in the graph tend to cluster together.

12. The method of claim 1 further comprising:
inputting the dynamic execution graph and the cryptographic entanglement metrics into an engine to determine whether the cryptographic entanglement metrics indicate that the process is part of ransomware attack, the engine evaluating the dynamic execution graph and the cryptographic entanglement metrics relative to a corpus of known benign patterns and malicious patterns.

13. The method of claim 1 further comprising:
inputting the dynamic execution graph and the cryptographic entanglement metrics into at least one machine learning model to determine whether the cryptographic entanglement metrics indicate that the process is part of ransomware attack, the engine evaluating the dynamic execution graph and the cryptographic entanglement metrics relative to a corpus of known benign patterns and malicious patterns.

14. The method of claim 13, wherein the dynamic execution graph is in the form of a directed (DAG) in which each node corresponds to an intercepted cryptographic function and each edge encodes a control-flow or data-flow relationship.

15. The method of claim 14, wherein the at least one machine learning model comprises at least one graph neural network.

16. The method of claim 15, wherein the at least one graph neural network comprises one or more of: a graph convolutional network, graph attention network, or a graph isomorphism network.

17. The method of claim 15, wherein the at least one graph neural network is trained by:
executing a first plurality of software samples known to be benign and by executing a second plurality of software samples known to be malicious in a controlled sandbox environment;
monitoring cryptographic behavior during execution of each software sample; and
constructing a dynamic execution graph for each software sample based on the corresponding monitored cryptographic behavior to result in a corpus of labeled training dynamic execution graphs; and
training the at least one graph neural network using the corpus of labeled training dynamic execution graphs.

18. The method of claim 17, wherein cross-entropy loss is minimized over a classification output of the at least one graph neural network.

19. The method of claim 15, wherein the at least one graph neural network comprises an ensemble of graph neural networks which are independently trained and outputs of which are combined or weighted.

20. The method of claim 13, wherein the at least one machine learning model comprises an unsupervised autoencoder which is configured to detect previously unseen or obfuscated ransomware variants that exhibit structural or statistical deviations from known-good entropy and complexity profiles.

21. The method of claim 13, wherein features input into the at least one machine learning model comprise: node and edge count, graph density, betweenness and centrality, cycle count or recursion depth, and clustering coefficient.

22. The method of claim 1, wherein the one or more remediation actions comprise:
flagging the process for further inspection or administrative review.

23. The method of claim 1, wherein the one or more remediation actions comprise:
suspending or terminating the process.

24. The method of claim 1, wherein the one or more remediation actions comprise:
isolating or revoking access to files associated with the files to files associated with the process.

25. The method of claim 1, wherein the one or more remediation actions comprise:
isolating or revoking access to files subject to ransomware attack.

26. The method of claim 1, wherein the one or more remediation actions comprise:
blocking outbound network communication.

27. The method of claim 1, wherein the one or more remediation actions comprise:
capturing snapshots of memory used by the process for forensic analysis.

28. A system comprising:
at least one data processor; and
memory storing instructions which, when executed by one or more computing devices, result in operations comprising:
intercepting, by an agent executing on a monitored computing device and by using one or more hooks into cryptographic application programming interfaces (APIs), runtime execution data associated with a process executing on the monitored computing device;
constructing a dynamic execution graph in which each node corresponds to an intercepted cryptographic API call and each edge represents an inferred relationship between nodes derived from the runtime execution data;
computing cryptographic entanglement metrics based on the dynamic execution graph which characterize structural properties of cryptographic behavior within the process; and
initiating one or more remediation actions when the computed cryptographic entanglement metrics indicate that the process is part of ransomware attack, the one or more remediation actions acting to thwart advancement of the ransomware attack.

* * * * *